Aug. 13, 1935.   J. P. GATY   2,011,359
LENS MOUNT FOR CAMERAS
Filed Dec. 11, 1934   3 Sheets-Sheet 1
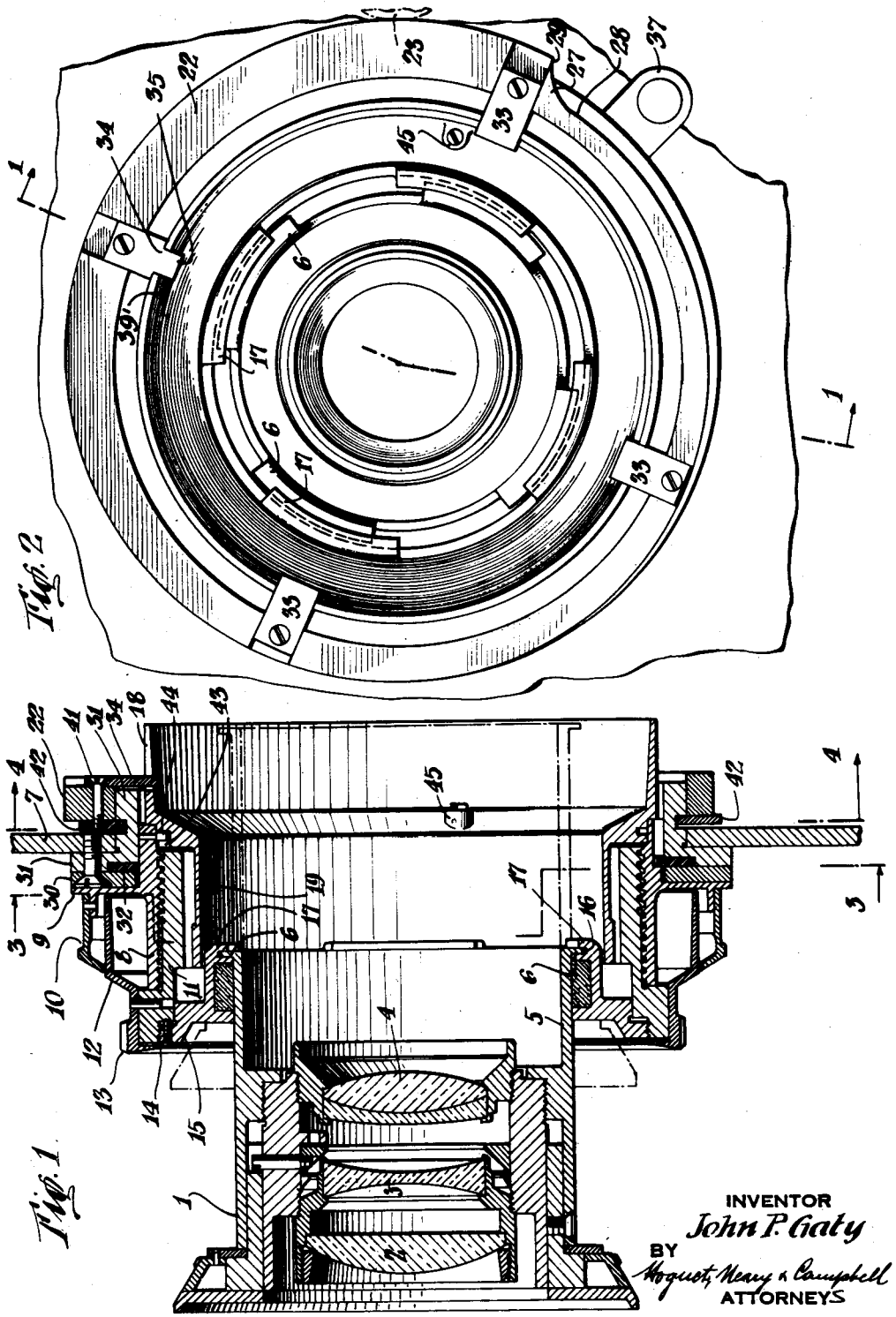
INVENTOR
John P. Gaty
BY
*Hoguet, Neary & Campbell*
ATTORNEYS Aug. 13, 1935.  J. P. GATY  2,011,359
LENS MOUNT FOR CAMERAS
Filed Dec. 11, 1934  3 Sheets-Sheet 2
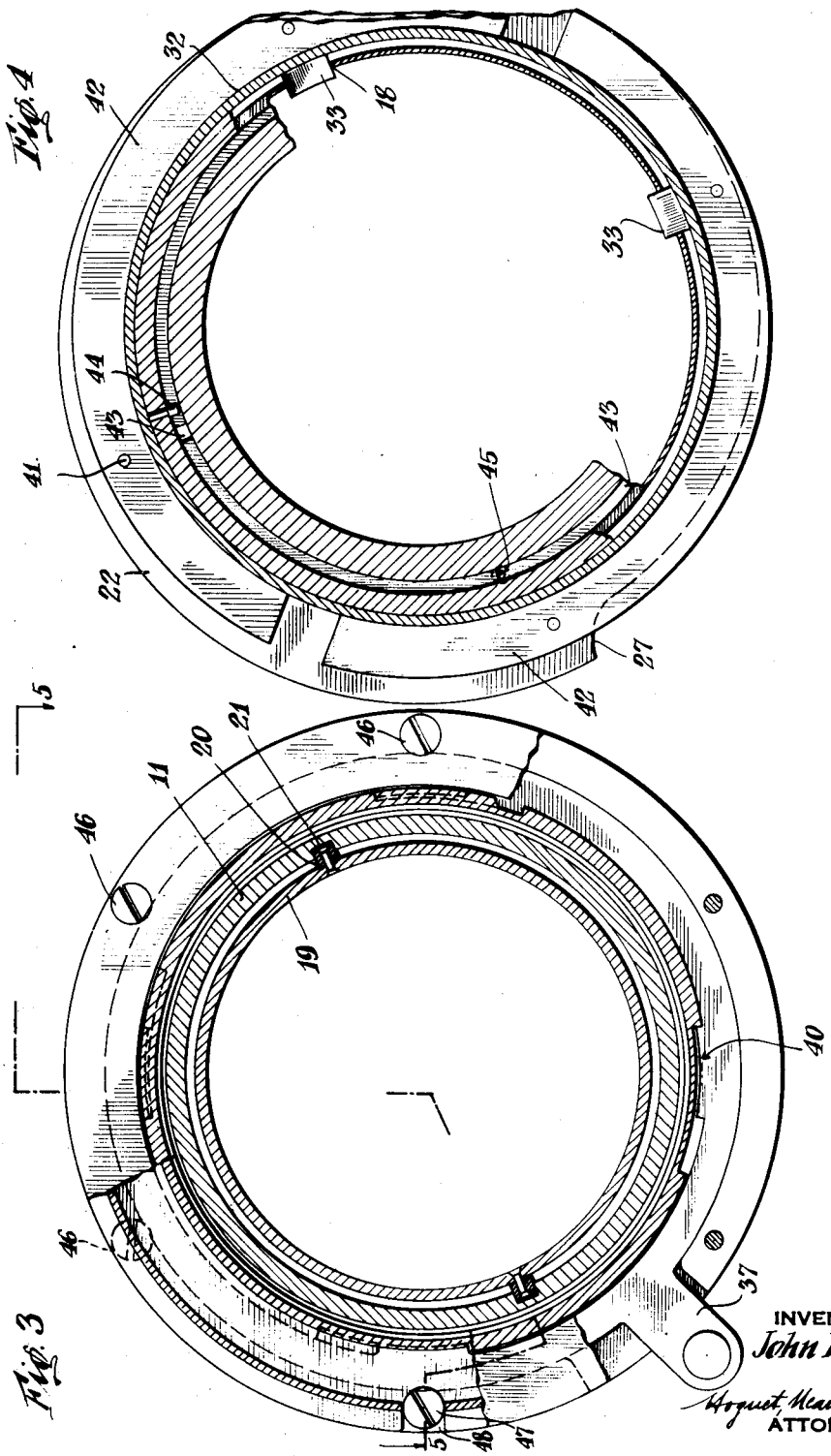
INVENTOR
John P. Gaty
ATTORNEYS Aug. 13, 1935.   J. P. GATY   2,011,359
LENS MOUNT FOR CAMERAS
Filed Dec. 11, 1934   3 Sheets-Sheet 3
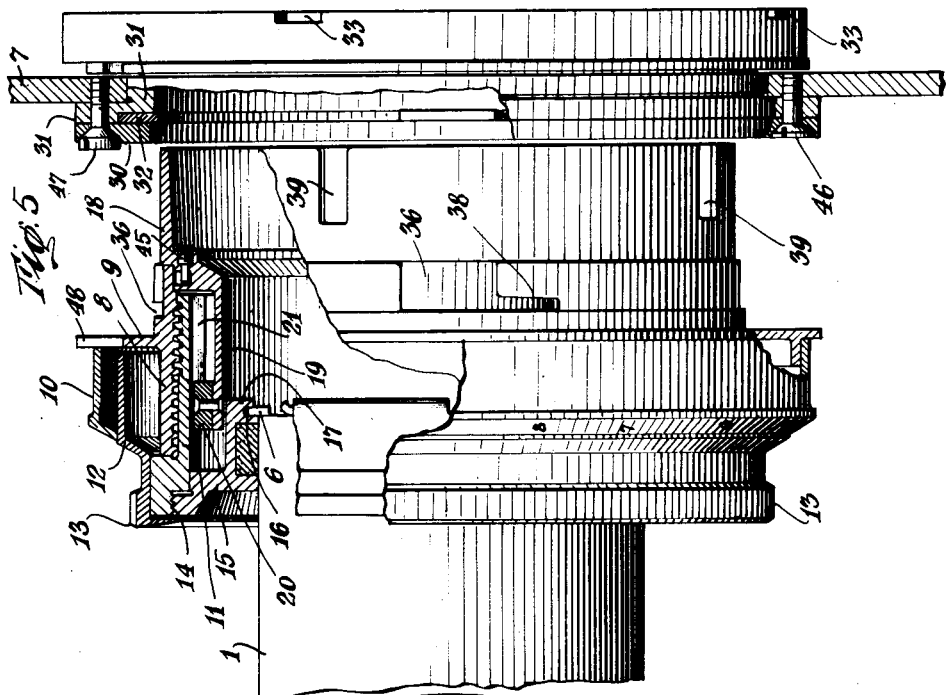
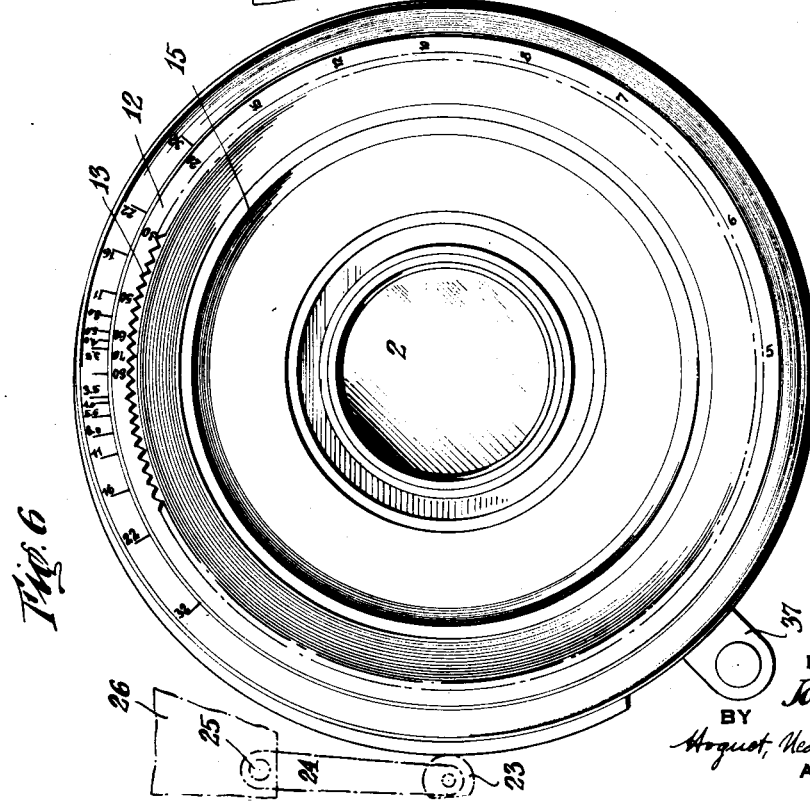
INVENTOR
John P. Gaty
BY
Hoguet, Neary & Campbell
ATTORNEYS

Patented Aug. 13, 1935

2,011,359

UNITED STATES PATENT OFFICE 2,011,359

LENS MOUNT FOR CAMERAS

John P. Gaty, Woodside, N. Y., assignor to Fairchild Aerial Camera Corporation, Woodside, N. Y., a corporation of New York Application December 11, 1934, Serial No. 756,929

5 Claims. (Cl. 95—44)

This invention relates in general to cameras and more particularly to a mount for a camera lens.

An object of the invention is to provide a mount in the form of a self-contained unit that will be adapted to receive a wide range of sizes of lenses.

Another object is to provide such a mount with simple and positive locking devices that will permit quick and convenient changes of lenses.

Another object is to provide a lens mount in combination with a range finder in which the operating means for adjusting the range finder and the lens mount have a predetermined definite relationship when the lens is fully mounted so that out-of-phase relationship is positively avoided.

A further object is to provide a simple and improved range finder adjustment device that will be suitable for perfect operation over a wide range of lens changes.

With these and other ends in view it is proposed to provide a permanently mounted cam surrounding a flange extension of the lens mount and to provide a range finder adjustment device in the form of a cam follower engaging the permanently mounted cam and acting laterally, or in other words, at right angles to the lens axis. This cam due to its design and relationship to the lens mount insures a proper operation over a wide range of interchangeable lenses of different types. The lens mount is preferably provided with simple and effective locking lugs so as to permit quick change of lenses and proper alignment. At the same time the cam engagement ring is preferably fitted with one narrow groove so that out-of-phase engagement is avoided, and so arranged that cam lugs must enter the cam ring before the lens may be locked in place.

With the foregoing and other objects in view, the invention resides in the combination of parts and in the details of construction hereinafter set forth in the following specification and appended claims, certain embodiments thereof being illustrated in the accompanying drawings, in which:

Figure 1 is a view in longitudinal section taken through the lens, mount and the cam and follower for adjustment of a range finder;

Figure 2 is a view in rear elevation of the device;

Figure 3 is a view in section taken along line 3—3 of Figure 1;

Figure 4 is a view in section taken along line 4—4 of Figure 1;

Figure 5 is a view in section taken along line 5—5 of Figure 3;

Figure 6 is a view in front elevation of the lens and mount.

Referring more particularly to the drawings, the lens casing 1 may be of cylindrical form to enclose such lenses as shown at 2, 3 and 4. The casing has an integral extension 5 terminating inwardly in a plurality of upstanding flanges 6.

The front of the camera is indicated by the partition 7. To this partition are secured means for attaching the separable lens mount as well as means for supporting the cam for operating the range finder.

The separable mount for carrying the lens casing comprises a stationary member including an internally threaded sleeve 8, an annular flange 9 and a cover member 10. The lens mount also includes members rotatable together with respect to the stationary member. These rotatable members include a rotatable sleeve 11 with threads to mesh with those of internally threaded sleeve 8. Fixed to sleeve 11 is a cover 12 with a knurled adjustment ring 13. Also fixed by screw threads 14 to sleeve 11 is a support 15 provided with arcuate inclined slots 16 and flanges 17 to form with flanges 6 of the lens casing a bayonet lock, thus providing a quick detachable lock for the lens casing for the purpose of retracting the lens into the mount. The mount also includes a rotatable member 18 which includes an integral portion 19 carrying a pair of fixed keys 20 fitting in longitudinal slots 21 in the sleeve 11. Thus as the knurled ring 13 is rotated manually the sleeve 11 rotates and due to the meshing thereof with the stationary internally threaded sleeve 8 also moves inwardly or outwardly in accordance with the direction of rotation of the knurled ring 13. The member 18, 19, by reason of the key 20 and slot 21 rotates with the sleeve 11 but does not move longitudinally.

The camera carries a permanently mounted cam for the operation of the range finder. It is essential therefore that the construction of the mount be such that will avoid any out-of-phase relationship between the lens and the cam when the removable lens assembly is assembled in the camera. The cam is shown at 22 and the follower may consist of a roller 23 carried by a lever 24 pivoted at 25 so as to work laterally or in other words at right angles to the lens axis. The construction of the range finder itself may be standard and is shown no more than to be represented diagrammatically at 26. The cam itself is of gradually and continuously varying radii with the exception of a sudden incline 27 between its low point 28 and its high point 29.

The partition 7 has bolted thereto a ring 30 and an angular ring 31, the latter being recessed to receive a locking ring 32. This locking ring 32 is provided with four inwardly extending lugs 40 (see Figure 3). These lugs are for fitting in such recesses as shown in Figure 5 at 36. As the two parts of the unit shown separated in Figure 5 are brought together with the lugs 40 in the recesses 36 the operating handle 37 of the locking ring is rotated bringing the lugs in the restricted portion 38 of each slot 36 so as to form a bayonet lock.

The cam engagement ring or extension 18 is provided with a plurality of recesses 39 for the engagement of corresponding lugs 33, 34 fixed to the cam 22 by bolt 41. Lug 34 is narrowed at 35 and a special narrow slot 39' provided for it in ring 18 so that the ring 18 and cam 22 can engage in but a single phase relation. It follows then that when the complete device is properly assembled the cam 22 is rotated by the knurled ring 13 and at the same time the threaded sleeve 11 will advance or retract the lens along the axis to focus the lens on the selected object, by means previously described.

The extended sleeve portion of ring 31 is provided with an annular recess to receive a segmental ring 42 bolted to the cam by bolts 41 to prevent longitudinal movement of the cam.

In order to limit the relative rotational movement of member 19 with respect to the stationary internally threaded sleeve 8 the member 19 is provided with an annular groove 43 to receive a pin 44 fixed to sleeve 8. The rotary member 19 has fixed thereto a pin 45 which also rides in groove 43 and the abutment of pin 45 with pin 44 limits the rotation of member 19 and consequently the lens and cam in either direction.

In assembling the device the following steps are necessary in order to lock the lens casing and mount in place and as previously described when such locking has taken place the proper relationship between the lens and range finder cam is assured. The lens casing may be locked by the engagement of the bayonet lock including lugs 6 and 17. It has been mentioned before that rings 30 and 31 are bolted together. The bolts for accomplishing this are shown as a plurality of bolts 46 the outer face of which is flush with the outer surface of ring 30 (see Figure 5) except one of such bolts is shown at 47 of slightly different dimensions so as to protrude. That part of the unit between 1 and 18 is moved to the right until lug 35 is engaged in its particular groove 39' in the movable member 18. Members 10 and 9 are then rotated until the special bolt 47 engages with the recess 48 in member 9. The cam having been previously engaged with the driving member 18, it will be carried along as the members 10 and 9 are rotated, unless relative slippage occurs between the sleeves 8 and 11. In any case it will be properly aligned with the member 18 and when bolt 47 engages recess 48 the lens can be pushed home and secured rigidly in place by turning the locking ring 32 which will engage lugs 40 with slotted recesses 38. The lens and cam are then in proper phase relationship and the assembly is complete.

I claim:

1. In combination in a camera, a lens and lens casing, a range finder operating device and a mount therefor, a mount for said lens casing, the latter mount being interchangeable, locking devices for said interchangeable lens casing mount, self-aligning locking devices for securing said lens casing mount on said camera and for effecting an operative connection between said lens casing mount and said range finder operating device, said self-aligning lens casing mount locking devices being adapted when locked to insure a predetermined proper relationship between the adjustment of the lens and the adjustment of said range finder operating device caused thereby.

2. In combination in a camera, a lens and a lens casing, a range finder operating device including a permanently mounted cam and a releasable follower therefor operating at right angles to the axis of said lens.

3. In combination in a camera, a lens and a lens casing, a range finder operating device including a permanently mounted cam and a follower therefor operating at right angles to the axis of said lens, an adjustable lens mount, said lens being interchangeable with respect to said camera, locking devices for releasably securing said mount to said camera and for effecting a releasable driving connection between said mount and said cam.

4. In combination in a camera, a lens, a range finder operating device including a permanently mounted cam and a follower therefor operating at right angles to the axis of said lens, an adjustable lens mount, locking devices for releasably securing said mount to said camera and for effecting a releasable driving connection between said mount and said cam, said locking devices being self-aligning and adapted to prevent the effecting of said driving connection until the completion of the proper predetermined engagement of said locking devices for locking said lens mount on said camera, for the purpose of insuring a proper predetermined relationship between the state of adjustment of said lens mount with that of said cam.

5. In combination in a camera, a lens and a lens casing, a range finder operating device including a permanently mounted cam and a follower therefor, said cam and follower being self-aligned, an adjustable lens mount, said lens being interchangeable with respect to said camera, locking devices for releasably securing said mount to said camera and for effecting a releasable driving connection between said mount and said cam.

JOHN P. GATY.